US012597184B2

(12) United States Patent
Wang et al.

(10) Patent No.: US 12,597,184 B2
(45) Date of Patent: Apr. 7, 2026

(54) IMAGE PROCESSING METHOD AND APPARATUS, DEVICE AND READABLE STORAGE MEDIUM

(71) Applicant: Beijing Zitiao Network Technology Co., Ltd., Beijing (CN)

(72) Inventors: Xu Wang, Beijing (CN); Kai Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 230 days.

(21) Appl. No.: 18/264,402

(22) PCT Filed: Jan. 29, 2022

(86) PCT No.: PCT/CN2022/075130
§ 371 (c)(1),
(2) Date: Aug. 4, 2023

(87) PCT Pub. No.: WO2022/166907
PCT Pub. Date: Aug. 11, 2022

(65) Prior Publication Data
US 2024/0046537 A1    Feb. 8, 2024

(30) Foreign Application Priority Data
Feb. 5, 2021    (CN) .......................... 202110164141.7

(51) Int. Cl.
*G06T 11/60* (2006.01)
*G06T 5/50* (2006.01)
(Continued)

(52) U.S. Cl.
CPC ................ *G06T 11/60* (2013.01); *G06T 5/50* (2013.01); *G06T 5/70* (2024.01); *G06T 11/001* (2013.01);
(Continued)

(58) Field of Classification Search
CPC ... G06T 11/60; G06T 5/50; G06T 5/70; G06T 11/001; G06T 2207/10024;
(Continued)

(56) References Cited

U.S. PATENT DOCUMENTS 5,450,217 A        9/1995   Eschbach et al.
2003/0156117 A1*   8/2003   Higuchi .................. G06T 15/04
                                                       345/582
(Continued)

FOREIGN PATENT DOCUMENTS

CN        101587593 A      11/2009
CN        103021002 A       4/2013
(Continued)

OTHER PUBLICATIONS

European Patent Office, Office Action Issued in Application No. 22749186.7, Jul. 12, 2024, 6 pages.
(Continued)

*Primary Examiner* — King Y Poon
*Assistant Examiner* — Patrick P Galera
(74) *Attorney, Agent, or Firm* — Alleman Hall LLP

(57) ABSTRACT

An image processing method and apparatus, a device and a readable storage medium are provided in embodiments of the present disclosure. After acquiring a source image, an electronic device generates a grayscale image based on the source image, and performs Gaussian blur on the grayscale image to obtain a Gaussian blur image. Then, the electronic device generates a first sketch image by using the Gaussian blur image and the grayscale image.

15 Claims, 9 Drawing Sheets

(51) Int. Cl.

| | |
|---|---|
| *G06T 5/70* | (2024.01) |
| *G06T 11/00* | (2006.01) |
| *G06V 10/25* | (2022.01) |
| *G06V 10/54* | (2022.01) |
| *G06V 10/56* | (2022.01) |

(52) U.S. Cl.

CPC .............. *G06V 10/25* (2022.01); *G06V 10/54* (2022.01); *G06V 10/56* (2022.01); *G06T 2207/10024* (2013.01); *G06T 2207/20221* (2013.01)

(58) Field of Classification Search

CPC . G06T 2207/20221; G06T 2207/20032; G06T 2207/20081; G06T 2207/30201; G06T 3/04; G06V 10/25; G06V 10/54; G06V 10/56

See application file for complete search history.

(56) References Cited

U.S. PATENT DOCUMENTS

| | | | | |
|---|---|---|---|---|
| 2014/0071148 A1* | 3/2014 | Webb | .................... | G06T 11/001 |
| | | | | 345/582 |
| 2014/0218769 A1* | 8/2014 | Tolstaya | ................ | G06F 3/1244 |
| | | | | 358/2.1 |
| 2016/0048837 A1* | 2/2016 | Jin | ..................... | G06Q 20/3276 |
| | | | | 705/76 |
| 2019/0051028 A1* | 2/2019 | Sarma | ........................ | G06T 3/40 |
| 2020/0211189 A1* | 7/2020 | Yip | ......................... | G06V 20/69 |
| 2020/0320756 A1 | 10/2020 | Gehlaut et al. | | |

FOREIGN PATENT DOCUMENTS

| | | |
|---|---|---|
| CN | 105528765 A | 4/2016 |
| CN | 107170032 A | 9/2017 |
| CN | 107749045 A | 3/2018 |
| CN | 107864337 A | 3/2018 |
| CN | 108682040 A | 10/2018 |
| CN | 109300099 A | 2/2019 |
| CN | 109741243 A | 5/2019 |
| CN | 111462158 A | 7/2020 |
| CN | 112819691 A | 5/2021 |

OTHER PUBLICATIONS

Japan Patent Office, Office Action Issued in Application No. 2023-547662, May 28, 2024, 6 pages.

Yamada, Shinichi, "Only 30 seconds!! Photoshop ~ Illustration processing ~," Legit, Available Online at https://www.legit.co.jp/photoshop-Illustration-processing-only-30/1705, Oct. 25, 2013, 15 pages.

Saruwaka-kun, "Use Photoshop to process photos into illustration style (pencil touch)," Saruwaka, Available Online at https://saruwakakun.com/design/photoshop/retouch-pencil, Jul. 12, 2017, 20 pages.

International Search Report for International Application No. PCT/CN2021/117199, mailed Dec. 17, 2021, 5 pages.

China National Intellectual Property Administration, Notice of Allowance Issued in Application No. 202110164141.7, May 22, 2023, 5 pages.

China National Intellectual Property Administration, Office Action and Search Report Issued in Application No. 202110164141.7, Dec. 7, 2022, 10 pages. Submitted with partial English translation.

China National Intellectual Property Administration, Office Action and Search Report Issued in Application No. 202110164141.7, Mar. 1, 2023, 9 pages. Submitted with partial English translation.

China National Intellectual Property Administration, International Search Report and Written Opinion Issued in Application No. PCT/CN2022/075130, Apr. 11, 2022, WIPO, 14 pages.

Zhu, Y.,"Data Management and Analysis of Colposcopic Image," Dissertation, Shanghai Jiao Tong University, School of Life Sciences and Biotechnology, Jun. 1, 2020, 70 pages. Submitted with English abstract.

Wang, Y. et al., "A Generation Method of Chinese Meticulous Painting Based on Image," Transactions on Edutainment XI, Lecture Notes in Computer Science, vol. 8971, Sep. 12, 2015, 13 pages.

Choudhary, S., "Converting a Color Image to Sketch," Medium, Available Online at medium.com/@shalini47choudhary/converting-a-color-image-to-sketch-8ca58bf7e346, Jun. 29, 2020, 9 pages.

Priya, B., "Create your own sketch with OpenCV," Medium, Available Online at medium.com/analytics-vidhya/create-your-own-sketch-with-opencv-638a463c6ec6, Oct. 7, 2020, 17 pages.

European Patent Office, Extended European Search Report Issued in Application No. 22749186.7, Oct. 25, 2023, Germany, 10 pages.

* cited by examiner

3

1

2

Network

101

Acquire a source image

102

Convert the source image into a grayscale image

103

Perform Gaussian blur on the grayscale image to obtain a Gaussian blur image

104

Generate a first sketch image corresponding to the source image based on the Gaussian blur image and the grayscale image

IMAGE PROCESSING METHOD AND APPARATUS, DEVICE AND READABLE STORAGE MEDIUM

CROSS-REFERENCE TO RELATED APPLICATION

This application is a National Stage of International Application PCT/CN2022/075130, filed on Jan. 29, 2022, which claims priority to Chinese Patent Application No. 202110164141.7, filed on Feb. 5, 2021 and entitled "IMAGE PROCESSING METHOD AND APPARATUS, DEVICE AND READABLE STORAGE MEDIUM", both of which are hereby incorporated by reference in their entireties.

TECHNICAL FIELD

The present disclosure relates to the field of image processing technologies and, in particular, to an image processing method and apparatus, a device and a readable storage medium.

BACKGROUND

There are various image styles, and common image styles include cartoons, ancient costumes, etc. At present, images of other styles can be obtained by performing style conversion on an original image. For example, a deep learning model is trained in advance by using a manually drawn image sample such as a cartoon sample and a human image, and then the style conversion is performed on the original image by using the deep learning model, so as to obtain a cartoon.

A sketch is also a style of image that is popular among users. However, the prior art does not support converting a source image into an image of a sketch style.

SUMMARY

In a first aspect, an embodiment of the present disclosure provides an image processing method, including:

acquiring a source image;

converting the source image into a grayscale image;

performing Gaussian blur on the grayscale image to obtain a Gaussian blur image; and generating a first sketch image corresponding to the source image based on the Gaussian blur image and the grayscale image.

In a second aspect, an embodiment of the present disclosure provides an image processing apparatus, including:

an acquiring module, configured to acquire a source image;

a grayscale module, configured to generate a grayscale image based on the source image;

a processing module, configured to perform Gaussian blur on the grayscale image to obtain a Gaussian blur image; and a generating module, configured to generate a first sketch image corresponding to the source image based on the Gaussian blur image and the grayscale image.

In a third aspect, an embodiment of the present disclosure provides an electronic device, including: at least one processor and a memory;

where the memory stores computer execution instructions; and the at least one processor executes the computer execution instructions stored in the memory, causing the at least one processor to execute the image processing method according to the first aspect and various possible designs of the first aspect.

In a fourth aspect, an embodiment of the present disclosure provides a computer-readable storage medium. The computer-readable storage medium stores computer execution instructions. When a processor executes the computer execution instructions, the image processing method according to the first aspect and various possible designs of the first aspect is implemented.

In a fifth aspect, an embodiment of the present disclosure provides a computer program product including a computer program stored in a readable storage medium, at least one processor of an electronic device reads the computer program from the readable storage medium, and the at least one processor executes the computer program, causing the electronic device to execute the method according to the first aspect.

In a sixth aspect, an embodiment of the present disclosure provides a computer program. The computer program is stored in a readable storage medium. At least one processor of an electronic device reads the computer program from the readable storage medium, and the at least one processor executes the computer program, causing the electronic device to execute the method according to the first aspect.

BRIEF DESCRIPTION OF DRAWINGS

To describe technical solutions in embodiments of the present disclosure or in the prior art more clearly, the following briefly introduces accompanying drawings required for describing the embodiments or the prior art. Apparently, the accompanying drawings in the following description show some embodiments of the present disclosure, and other drawings may also be obtained by a person of ordinary skill in the art according to these drawings without creative efforts.

DESCRIPTION OF EMBODIMENTS

To make objects, technical solutions and advantages of embodiments of the present disclosure clearer, technical solutions in the embodiments of the present disclosure will be described hereunder in a clear and comprehensive way in combination with the drawings related to the embodiments of the present disclosure. Obviously, the described embodiments are merely a part but not all of the embodiments of the present disclosure. All other embodiments obtained by a person of ordinary skill in the art based on the embodiments of the present disclosure without creative efforts shall belong to the protection scope of the present disclosure.

At present, many applications (applications, APPs) have a function of style conversion. Based on the function, a user can conveniently convert an image into a cartoon style, a sketch style, and the like. A quadratic element cartoon is an art that pays attention to expressionism, generally, based on a deep learning manner, a deep learning model is trained by using a manually drawn image sample such as a cartoon sample and a human image, where a drawn style of the cartoon sample is the same. The deep learning model is provided in an electronic device such as a user's mobile terminal or a server. After acquiring an original image, the electronic device inputs the original image into the deep learning model, so as to output a cartoon. In a training process of the model, a lot of details, for example, facial features, cannot be preserved. However, the requirement of "realism" is not high for a cartoon, therefore, even if a lot of details in a cartoon obtained by using the deep learning model are ignored, the cartoon can achieve a good expressionism effect and be accepted by the user.

However, a pencil sketch is more realistic, and a content-realistic image is required, thereby focusing more on details. For example, an original image is a human image, and a pencil sketch obtained based on the original image is considered to be qualified only if a human face, facial features, etc. in the pencil sketch are closely attached to the human image. Apparently, the described deep learning manner is not suitable for acquiring a pencil sketch.

Figure 1:
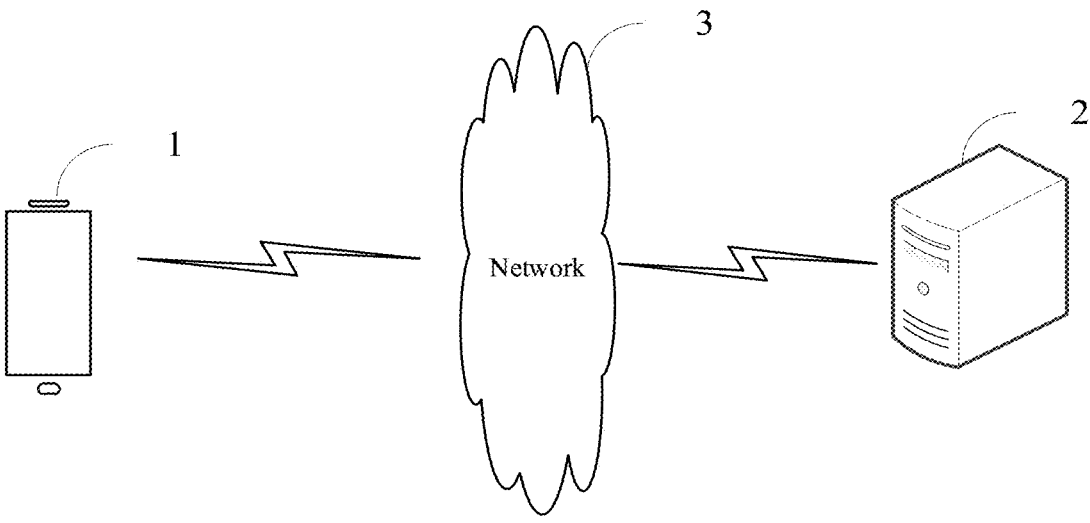
FIG. 1 is a schematic diagram of a network architecture of an image processing method according to an embodiment of the present disclosure.

FIG. 1 is a schematic diagram of a network architecture of an image processing method according to an embodiment of the present disclosure. Referring to FIG. 1, the network architecture includes a terminal device 1, a server 2, and a network 3. The terminal device 1 and the server 2 establish a network connection through the network 3. The network 3 includes a variety of network connection types, such as wired, wireless communication links, or fiber optic cables, etc.

A user uses the terminal device 1 to interact with the server 2 through the network 3 to receive or send messages, etc. Various communication client applications are installed in the terminal device 1, such as a video playing application, a shopping application, a searching application, an instant messaging tool, a mailbox client, a social platform software, etc.

The terminal device 1 may be hardware, and may also be software. When the terminal device 1 is hardware, the terminal device 1 is, for example, a mobile phone, a tablet computer, an e-book reader, a laptop portable computer, a desktop computer, etc. When the terminal device 1 is software, the terminal device 1 may be installed in the foregoing listed hardware devices. In this case, the terminal device 1 is, for example, a plurality of software modules or a single software module, and the embodiments of the present disclosure are not limited thereto.

The server 2 is a server capable of providing a plurality of services, and is used for receiving a source image sent by the terminal device, and performing style conversion on the source image to obtain a pencil sketch, such as a black-and-white sketch image or a color pencil sketch.

The server 2 may be hardware, and may also be software. When the server 2 is hardware, the server 2 is a single server or a distributed server cluster formed by a plurality of servers. When the server 2 is software, the server 2 may be a plurality of software modules or a single software module, and the embodiments of the present disclosure are not limited thereto.

It should be understood that the number of the terminal device 1, the server 2 and the network 3 in FIG. 1 is merely illustrative. In practical implementations, any number of terminal devices 1, servers 2 and networks 3 are deployed according to practical requirements.

In addition, when the image processing method of the present disclosure is executed by the terminal device 1, since networking is not required, the server 2 and the network 3 described above in FIG. 1 may not exist.

The image processing method according to the embodiments of the present application will be described in detail hereunder based on the network architecture shown in FIG. 1. Illustratively, reference is made to FIG. 2.

Figure 2:
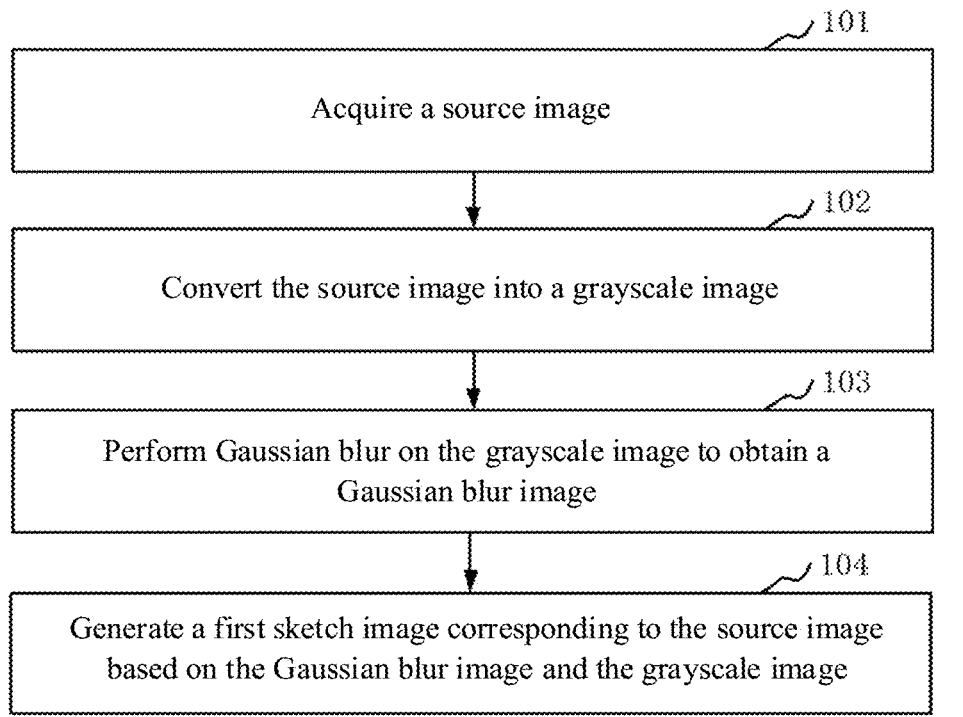
FIG. 2 is a flowchart of an image processing method according to an embodiment of the present application.

FIG. 2 is a flowchart of an image processing method according to an embodiment of the present application. An execution subject of this embodiment is an electronic device, and the electronic device is, for example, the foregoing terminal device or server in FIG. 1. The embodiment includes the following steps.

101, acquire a source image.

Illustratively, the electronic device acquires the source image locally, or acquires the source image from Internet. The source image is also referred to as image_src. The source image is a red green blue (red green blue, RGB) image, a black-and-white photo, etc., and the embodiment of the present disclosure is not limited thereto.

102, convert the source image into a grayscale image.

Illustratively, the electronic device performs grayscale processing on each pixel of the source image, so as to convert the source image into a grayscale image. For example, the electronic device averages values of R, G, and B for each pixel, and uses an average value as a grayscale value. For another example, for each pixel in the source image, the electronic device determines a maximum value and a minimum value among R, G, and B of the pixel, and an average value of the maximum value and the minimum value is taken as the grayscale value. For yet another example, the electronic device adopts a binary image method, a weighted average method, or the like to generate a grayscale image for the source image.

In the embodiment of the present disclosure, the grayscale image is also referred to as image_gray.

103, perform Gaussian blur on the grayscale image to obtain a Gaussian blur image.

Illustratively, the electronic device determines a Gaussian kernel corresponding to the Gaussian blur according to a Gaussian convolution, etc., and performs Gaussian blur on the grayscale image by using the Gaussian kernel, so as to obtain a Gaussian blur image. The Gaussian kernel is, for example, 255 etc. The electronic device uses different Gaussian kernels to perform Gaussian blur on the grayscale image, and obtains different Gaussian blur images. In the embodiment of the present disclosure, the Gaussian blur image is also referred to as image_blur.

104, generate a first sketch image corresponding to the source image based on the Gaussian blur image and the grayscale image.

In this step, the electronic device uses the Gaussian blur image and the grayscale image as a material to generate a first sketch image. For example, the electronic device performs fusion processing on pixels in the Gaussian blur image and corresponding pixels in the grayscale image, so as to generate the first sketch image. In the embodiment of the present disclosure, the first sketch image is also referred to as image_target.

Since the electronic device uses different Gaussian kernels to perform Gaussian blur on the grayscale image, and different Gaussian blur images are obtained, sketch images generated by the electronic device based on the grayscale image and different Gaussian blur images are different. Illustratively, reference is made to FIG. 3A and FIG. 3B.

Figure 3A:
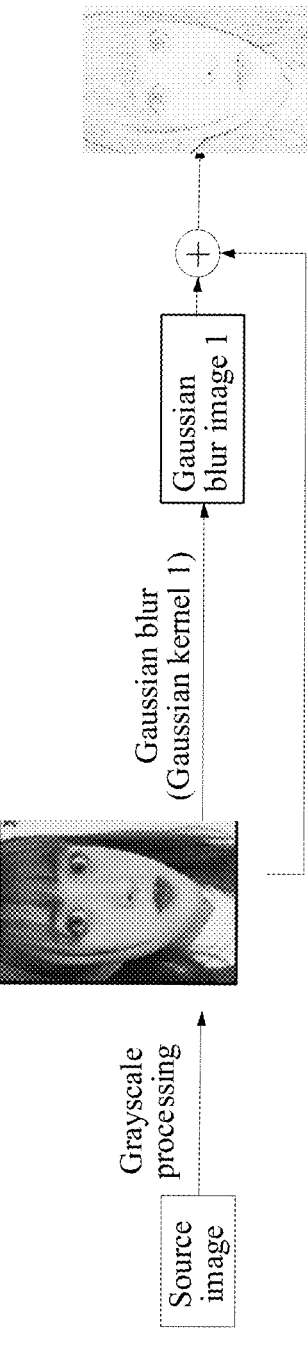
FIG. 3A is a schematic diagram of a process of generating a sketch image in an image processing method according to an embodiment of the present disclosure.

FIG. 3A is a schematic diagram of a process of generating a first sketch image in an image processing method according to an embodiment of the present disclosure. Referring to FIG. 3A, when Gaussian kernel 1 is relatively small, the first sketch image generated based on Gaussian blur image 1 and the grayscale image is relatively light.

Figure 3B:
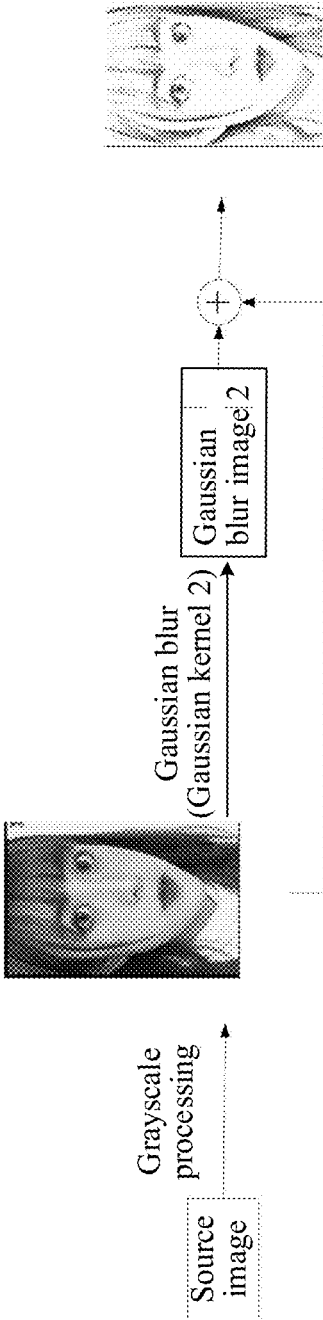
FIG. 3B is a schematic diagram of a process of generating a sketch image in an image processing method according to an embodiment of the present disclosure.

FIG. 3B is a schematic diagram of a process of generating a sketch image in an image processing method according to an embodiment of the present disclosure. Referring to FIG. 3B, when Gaussian kernel 2 is relatively large, the first sketch image generated based on Gaussian blur image 2 and the grayscale image is relatively heavy.

In the above FIG. 3A and FIG. 3B, the source image is, for example, a color image or a black-and-white image, and the embodiment of the present disclosure is not limited thereto. The first sketch image in FIG. 3A and FIG. 3B is also referred to as a first sketch image at different levels. That is to say, the first sketch image in FIG. 3A is a semi-finished product that simulates a painting process of a painter, and the first sketch image in FIG. 3B is equivalent to a finished product in the painting process of the painter.

According to the image processing method provided in the embodiment of the present disclosure, after acquiring the source image, the electronic device generates the grayscale image based on the source image, and performs Gaussian blur on the grayscale image to obtain the Gaussian blur image. Then, the electronic device uses the Gaussian blur image and the grayscale image to generate the first sketch image. By adopting this solution, the electronic device can obtain the first sketch image by means of grayscale processing, Gaussian blur, and the like, a detail part is preserved to a great extent, so that the first sketch image is realistic without a deep learning process, and the efficiency is high.

In the foregoing embodiment, after acquiring the source image, the electronic device performs denoising processing on the source image. For example, the electronic device performs median filtering on an original image, thereby eliminating noise that may exist in the original image. In addition, the electronic device may also perform denoising processing on the source image by means of mean filtering, adaptive Wiener filtering, etc. The present disclosure does not limit a specific way for denoising processing.

By adopting the solution, the electronic device performs denoising processing on the source image, so as to suppress or eliminate noise in the source image, thereby achieving a purpose of improving quality of the source image.

In the foregoing embodiment, in a process where the electronic device generates the first sketch image based on the Gaussian blur image and the grayscale image, a pixel value of a pixel in the first sketch image is determined according to a pixel value of a pixel in the grayscale image and a pixel value of a pixel in the Gaussian blur image, where sizes of the grayscale image, the Gaussian blur image and the first sketch image are the same, and pixels in the grayscale image, the Gaussian blur image and the first sketch image are in one-to-one correspondence. The sketch image is generated according to the determined pixel value of the pixel in the first sketch image.

Illustratively, sizes of the source image, the grayscale image, the Gaussian blur image, and the first sketch image are the same, and pixels are in one-to-one correspondence. Therefore, the electronic device can determine a pixel value of a corresponding pixel in the sketch image according to pixel values of the pixels in the grayscale image and the Gaussian blur image, thereby obtaining the first sketch image. For example, after generating the Gaussian blur image, the electronic device adopts a dodge mode to extract an effect, that is, extraction is performed by using the following formula (1):

$$\text{image\_target} = (\text{image\_gray}/\text{gray\_blur1}) \times 255 \qquad \text{formula (1)}$$

By adopting this scheme, first sketch images at different levels can be obtained based on dodge of different Gaussian kernels.

In the foregoing embodiment, if the source image includes a hair area of a person, in the first sketch image obtained based on step 104, the color of the hair area is highlighted and white. However, in practice, hair in the first sketch image is black, therefore, the first sketch image needs to be corrected to obtain a second sketch image. In a correction process, the electronic device converts the source image into a hue saturation value (Hue Saturation Value, HSV) image. Then, the electronic device corrects the first sketch image according to a saturation of each pixel in the HSV image.

Illustratively, the electronic device converts the source image from an RGB mode to an HSV mode, so as to obtain an HSV image. The saturation of each pixel in the HSV image can be obtained according to the HSV image, and the saturation is also referred to as an S channel value. Then, the electronic device determines a highlighted area, i.e., an area to be corrected, from the first sketch image according to the saturation of each pixel in the HSV image. For example, the electronic device determines a saturation threshold, and if a saturation of a certain pixel in the HSV image exceeds a preset saturation, the pixel is taken as a pixel in the highlighted area. Then, the highlighted area in the first sketch image is corrected to obtain the second sketch image.

For another example, the electronic device normalizes the saturation of each pixel in the HSV image to 0-1. The highlighted area to be corrected is determined from the first sketch image according to the saturation of each pixel in the HSV image after normalization. For example, the source image is a 640×480 image, and after the source image is converted into the HSV image, if it is found that saturations of 20000 pixels in the HSV image after normalization exceed a preset threshold, 20000 pixels are determined from the first sketch image according to the 20000 pixels in the HSV image, and color of the 20000 pixels in the first sketch image is deepened, so as to implement correction of the hair area contained in the first sketch image.

By adopting the solution, the electronic device determines a pixel to be corrected from the first sketch image and performs correction according to a saturation value of each pixel in the HSV image of the source image, thereby achieving the purpose of improving the quality of the first sketch image.

In the foregoing embodiment, when the electronic device determines the highlighted area from the first sketch image according to the saturations of the pixels in the HSV image, first, the electronic device determines, from the HSV image, a pixel whose saturation exceeds the preset threshold after normalization, to obtain a first pixel set. Then, the electronic device determines, according to the first pixel set, a second pixel set from the first sketch image, where pixels in the first pixel set and pixels in the second pixel set are in one-to-one correspondence, corresponding pixels are in the same position, and the second pixel set forms the highlighted area. The electronic device determines a third pixel set from the grayscale image according to the first pixel set, where pixels in the first pixel set and pixels in the third pixel set are in one-to-one correspondence. Finally, the electronic device performs weighted fusion on the pixels in the second pixel set and corresponding pixels in the third pixel set to correct the first sketch image.

Illustratively, the saturation of each pixel in the HSV image belongs to 0-1 after normalization. Assuming that a threshold is 0.5, the electronic device can determine, from the HSV image, pixels with saturations greater than or equal to 0.5 after normalization, and take these pixels as a first pixel set. Based on the first pixel set, the electronic device can determine a second pixel set from the first sketch image, and determines a third pixel set from the grayscale image. Pixels in the three pixel sets are in one-to-one correspondence, for example, pixel a exists in the first pixel set, pixel b exists in the second pixel set, and pixel c exists in the third pixel set, one-to-one correspondence refers to that a position of the pixel a in the HSV image is the same as a position of the pixel b in the first sketch image, the position of the pixel a in the HSV image is the same as a position of the pixel c in the grayscale image. Then, the electronic device performs weighted fusion on a pixel in the first sketch image and a corresponding pixel in the grayscale image, and then the second sketch image is obtained.

By adopting the solution, after a pixel to be corrected is determined, the electronic device performs weighted fusion on a pixel in the first sketch image and a corresponding pixel in the gray scale image, so as to achieve a purpose of correcting the first sketch image.

In the foregoing embodiment, when the electronic device performs weighted fusion on a pixel in the second pixel set and a corresponding pixel in the third pixel set to correct the first sketch image, first, the electronic device determines a first weight according to a saturation of a first pixel in the first pixel set after normalization, and determines a second weight according to the first weight, where the second weight is a difference between 1 and the first weight. Then, the electronic device determines a fourth pixel after the weighted fusion according to the pixel in the second pixel set, the pixel in the third pixel set, the first weight, and the second weight. Finally, the electronic device replaces a second pixel in the first sketch image with the fourth pixel to obtain the second sketch image.

Illustratively, pixels in the first pixel set, the second pixel set and the third pixel set are in one-to-one correspondence, and the pixels in one-to-one correspondence are a first pixel, a second pixel, and a third pixel. After the electronic device determines the first pixel set, a saturation of each first pixel in the first pixel set after normalization is taken as a first weight of the second pixel in the second pixel set, a difference between 1 and the first weight is taken as a second weight, where the second weight is a second weight of the third pixel in the third pixel set. Then, the electronic device performs weighted fusion on the second pixel and the third pixel according to the first weight and the second weight, so as to obtain a fourth pixel. For example, the saturation of the first pixel after normalization is 0.6, which is greater than the preset threshold 0.5; a grayscale value of the second pixel is 5, and a grayscale value of the third pixel is 100, then a grayscale value of the fourth pixel is 5×0.6+100×0.4=43.

In addition, in the foregoing embodiment, after determining the first pixel set, the electronic device takes the saturation of each first pixel in the first pixel set after normalization as a first weight of the third pixel in the third pixel set, and takes a difference between 1 and the first weight as a second weight, where the second weight is a weight of the second pixel in the second pixel set. Then, the electronic device performs weighted fusion on the second pixel and the third pixel according to the first weight and the second weight, so as to obtain the fourth pixel. For example, the saturation of the first pixel after normalization is 0.6, which is greater than the preset threshold 0.5; the grayscale value of the second pixel is 5, and the grayscale value of the third pixel is 100, then the grayscale value of the fourth pixel is 5×0.4+100×0.6=62.

After determining a corresponding fourth pixel for each pixel in the second pixel set, the electronic device replaces a second pixel in the first sketch image with the fourth pixel, so as to obtain the second sketch image.

Figure 4:
FIG. 4 is a schematic diagram of a process of correcting a first sketch image based on saturations in an image processing method according to an embodiment of the present disclosure.

FIG. 4 is a schematic diagram of a process of correcting a first sketch image based on saturations in an image processing method according to an embodiment of the present disclosure. Referring to FIG. 4, the source image, the first sketch image, and the second sketch image are shown from left to right in sequence. Apparently, hair whitening in the first sketch image is not a normal sketch effect, and after correction, a problem of highlighted and white hair is improved.

It should be noted that, the source image in FIG. 4 may also be a color image, and the embodiment of the present disclosure is not limited thereto.

By adopting such a solution, the electronic device determines a weight related to weighted fusion according to the saturations after normalization in the HSV image, thereby achieving a purpose of accurately correcting the first sketch image.

In the foregoing embodiment, in a process where the electronic device corrects the first sketch image according to the saturation of each pixel in the HSV image after normalization, only the highlighted area such as hair can be corrected, that is, improvement of local area, and global correction cannot be performed on the entire image. Therefore, after completing the described correction, the electronic device further needs to add shader (also referred to as add a texture) to the corrected black-and-white pencil drawing, so that the first sketch image is more like a hand-drawn picture and has a pencil drawing texture. In addition, sometimes, the problem of highlighted local area cannot be completely solved by means of the described correction. Therefore, after the described correction, the electronic device needs to add shader to further correct the second sketch image. In the process of adding the shader, the electronic device fuses a preset texture image and the corrected pencil sketch according to a pixel value of each pixel in the grayscale image.

For example, the electronic device determines a grayscale threshold, determines pixels whose grayscale values exceed the grayscale threshold from the grayscale image, determines corresponding pixels from the second sketch image according to these pixels, and adds a relative heavy texture to an area formed by these pixels. A relative light texture is added to an area formed by remaining pixels.

For another example, the electronic device normalizes a pixel value of each pixel in the grayscale image to 0-1, sets a threshold, and divides the pixels in the grayscale image into a plurality of sets according to the threshold, where the pixels in different sets have corresponding pixels in the sketch image after a first correction. Then, the electronic device fuses the texture image and the pencil sketch after the first correction, so as to incorporate the pencil drawing texture into the pencil sketch after the first correction. In an implementation, the electronic device determines a weight according to pixel values in the grayscale image after normalization, and incorporates the pencil drawing texture into the pencil sketch after the first correction according to the weight.

Figure 5:
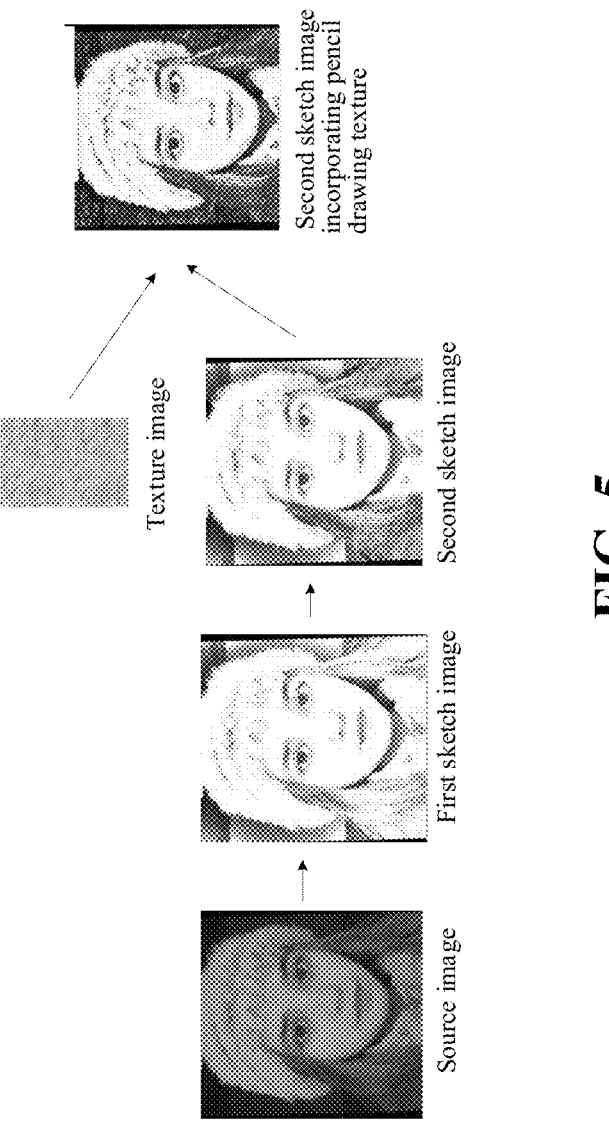
FIG. 5 is a schematic diagram of incorporating texture in an image processing method according to an embodiment of the present disclosure.

FIG. 5 is a schematic diagram of incorporating texture in an image processing method according to an embodiment of the present disclosure. Referring to FIG. 5, in the source image, a hat and a face are both whitish, and compared with each other, hair is darker in color. After a style conversion, in the obtained first sketch image, the hair, the hat and the face are all highlighted. However, since the hair area in the original image has a relatively dark color, the color of the hair area needs to be deepened, and the color of the face and hat area does not need to be deepened. When the electronic device performs correction based on the saturations of the HSV image, a pixel in the second pixel set determined from the first sketch image is taken as a pixel in the hair area. After the first correction, the color of the hair area is obviously deepened. Then, the electronic device fuses the texture image and the second sketch image, so as to incorporate the pencil drawing texture the into the second sketch image.

By adopting the solution, the electronic device adds texture to the second sketch image by means of adding texture, a purpose of incorporating the pencil drawing texture into the second sketch image, and a purpose of further correcting the second sketch image are achieved.

In the foregoing embodiment, there may be a plurality of preset texture images. For example, the preset texture images include a first texture image and a second texture image. Directions of texture of the first texture image and texture of the second texture image are inverse to each other, and texture color of the first texture image is deeper than texture color of the second texture image.

Figure 6:
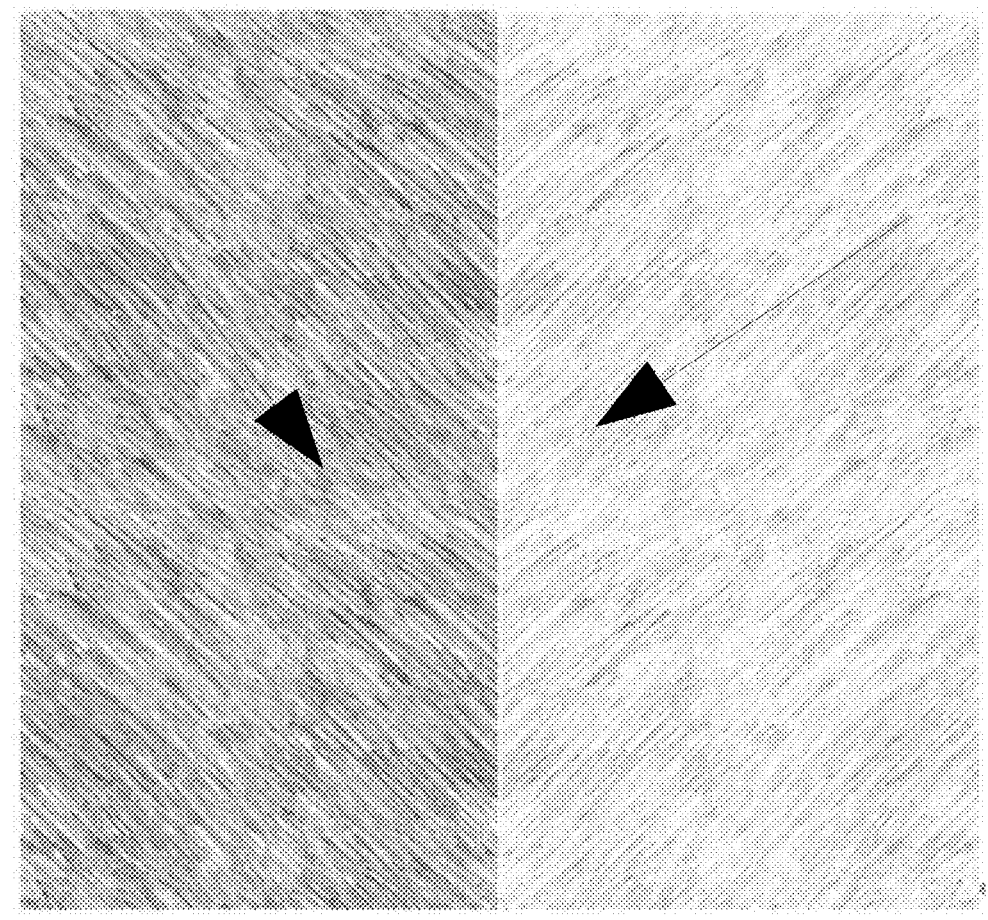
FIG. 6 is a schematic diagram of a texture image in an image processing method according to an embodiment of the present disclosure.

FIG. 6 is a schematic diagram of a texture image in an image processing method according to an embodiment of the present disclosure. Referring to FIG. 6, the first texture image is on the left, the second texture image is on the right, the first texture image has a darker color, the second texture image has a lighter color, and texture directions of the first texture image and the second texture image are shown by arrows in the figure. Apparently, the two directions are perpendicular (orthogonal) to each other.

Assuming that preset thresholds include 0.1, 0.33, and 0.5, the electronic device performs texture fusion according to the following formula (2):

$$\text{Result} = \begin{cases} \text{sketch} \times \text{Sketch} \times \text{Mask1} \times \text{Mask2} & \text{Gray } [0, 0.1] \\ \text{Sketch} \times \text{Mask1} \times \text{Mask2} & \text{Gray } (0.1, 0.33] \\ \text{Sketch} \times \text{Mask2} & \text{Gray } (0.33, 0.5] \\ \text{Sketch} & \text{Gray } (0.5, 1] \end{cases} \quad \text{formula (2)}$$

In the above formula (2), Result represents a value obtained by dividing a pixel value of a pixel in the second sketch image after the texture fusion by 255, Sketch represents a value obtained by dividing the pixel value of the pixel in the second sketch image by 255, Mask1 represents a value obtained by dividing a pixel value of a pixel in the first texture image by 255, and Mask2 represents a value obtained by dividing a pixel value of a pixel in the second texture image by 255. After a result is determined according to the above formula (2), a pixel value of a pixel after the fusion can be obtained by multiplying the result by 255.

By adopting this solution, the electronic device reasonably sets three thresholds, and fuses the second sketch image, the first texture image and the second texture image according to a normalized grayscale value of each pixel in the grayscale image, so as to incorporate the pencil drawing texture, so that lines of the second sketch image are smoother.

In the foregoing embodiment, when the source image is a color image, after the first sketch image is obtained, a third sketch image, that is, a color pencil sketch, may be further obtained. In a process of acquiring the third sketch image, the electronic device determines a weight of each pixel in the first sketch image according to a pixel value of each pixel in the first sketch image, and performs coloring on the first sketch image to obtain the third sketch image according to the pixel value of each pixel in the first sketch image, the weight of each pixel in the first sketch image, and a pixel value of each pixel in the source image.

Illustratively, the electronic device takes the first sketch image and the source image as a material, and obtains a mask by designing a segmentation function. The source image and the first sketch image are fused pixel by pixel based on the mask, so as to perform coloring on the first sketch image to obtain a third pencil sketch.

The electronic device determines the segmentation function according to the following formula (3):

$$\text{Mask value} = \begin{cases} 1 - \dfrac{1}{\text{thresh} \times 10} \times P[i][j], P[i][j] \le \text{thresh} \\ \min\left(0.9, -\log\dfrac{P[i][j] - \text{thresh}}{255 - \text{thresh}}\right), \text{others} \end{cases} \quad \text{formula (3)}$$

In the above formula (3), $P[i][j]$ represents a pixel value of a pixel in a black-and-white pencil drawing, with a value range being an integer from 0 to 255, i represents a horizontal coordinate of the pixel in the black-and-white pencil drawing, j represents a vertical coordinate of the pixel in the black-and-white pencil drawing, and the parameter thresh is, for example, 128. The above Mask value is a weight.

The electronic device performs pixel-by-pixel fusion on the source image and the first sketch image according to formula (4):

$$\text{image\_color} = \text{image\_target} \times (1 - \text{Mask value}) + \text{image\_src} \times \text{mask value} \quad \text{formula (4)}$$

Figure 7:
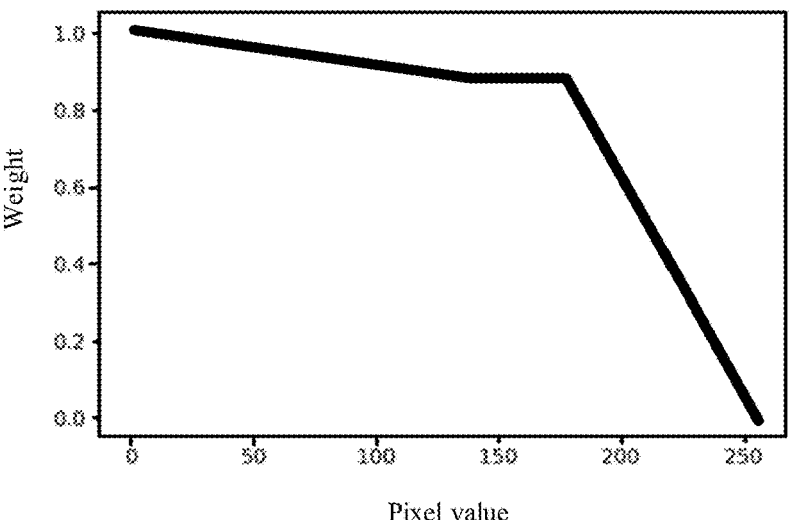
FIG. 7 is a schematic diagram of an effect curve of a fusion effect in an image processing method according to an embodiment of the present disclosure.

FIG. 7 is a schematic diagram of an effect curve of a fusion effect in an image processing method according to an embodiment of the present disclosure. Referring to FIG. 7, the horizontal axis indicates a pixel value of a pixel in the first sketch image, with a value range being 0-255. The vertical axis indicates a value of the weight in the fusion process, with a value range being 0-1. The effect curve is a three-section segmentation function, which is continuous as a whole, and seen from the fusion effect, when a pixel value of a pixel in the first sketch image is less than thresh, a weight of the pixel in the first sketch image is relative great, which is close to 1, a weight of a corresponding pixel in a corresponding source image is relative small, and the attenuation is slow. When a pixel value of a pixel in the first sketch image is greater than or equal to thresh, a weight of the pixel in the first sketch image remains 0.9, as shown by a part with pixel values 128-180 in the figure. After that, when a pixel value of a pixel in the first sketch image is larger than 180, a weight of the pixel in the first sketch image decreases sharply and attenuates rapidly to 0. In this way, the coloring effect of hair, eyeball and other parts can be better maintained, and other white and highlighted parts are not influenced by the source image.

By adopting such solution, a better coloring effect can be ensured while coloring the first sketch image.

In the above coloring process, coloring of the first sketch image is taken as an example for illustration. However, the embodiment of the present disclosure is not limited thereto. For example, in the coloring process, the second sketch image without texture being added may also be colored, or the second sketch image with texture being added may also be colored.

Figure 8A:
FIG. 8A is a schematic diagram of a process of coloring in an image processing method according to an embodiment of the present disclosure.

FIG. 8A is a schematic diagram of a process of coloring in an image processing method according to an embodiment of the present disclosure. Referring to FIG. 8A, a source image (color), a first sketch image and a third sketch image are shown from left to right.

Figure 8B:
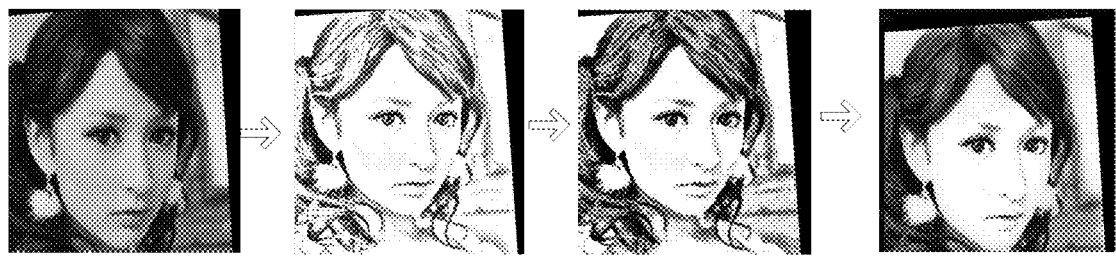
FIG. 8B is a schematic diagram of a process of coloring in an image processing method according to an embodiment of the present disclosure.

FIG. 8B is a schematic diagram of a process of coloring in an image processing method according to an embodiment of the present disclosure. Referring to FIG. 8B, a source image (color), a first sketch image, a second sketch image and a third sketch image are shown from left to right.

In addition, the foregoing image processing method may also be modified into another method. Illustratively, reference is made to FIG. 9.

Figure 9:
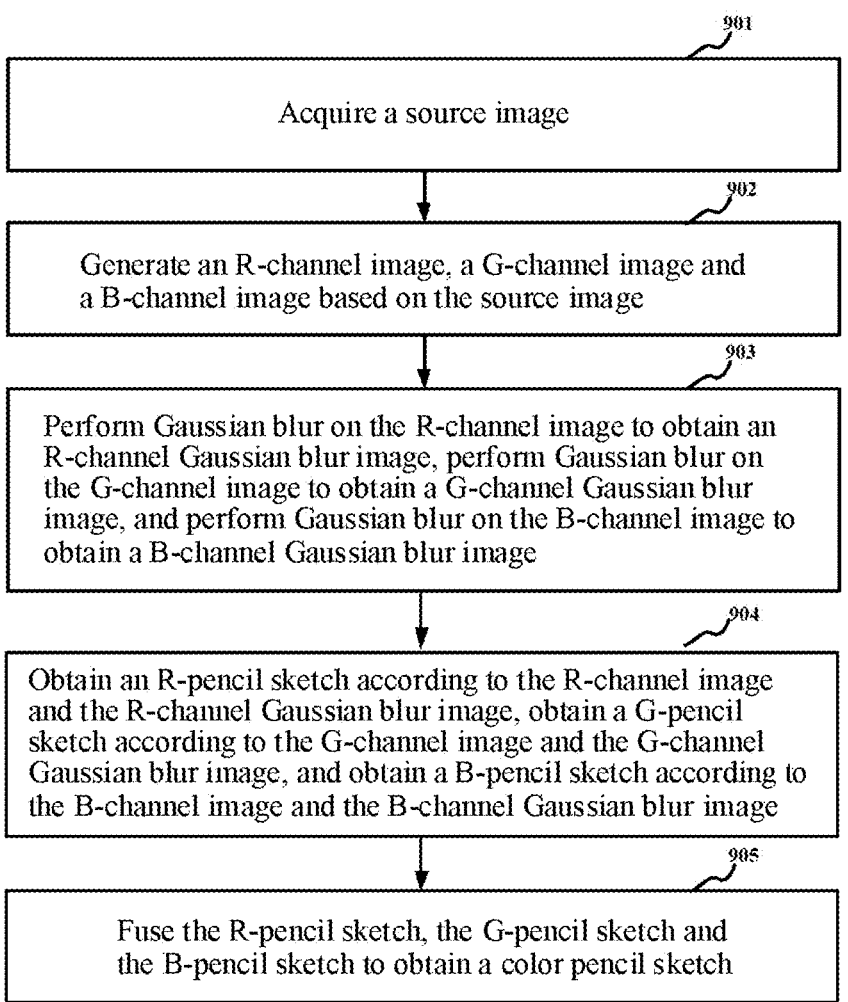
FIG. 9 is a flowchart of an image processing method according to an embodiment of the present application.

FIG. 9 is a flowchart of an image processing method according to an embodiment of the present application. An execution subject of this embodiment is an electronic device, and the electronic device is, for example, the foregoing terminal device or server in FIG. 1. This embodiment includes the following steps.

901, acquire a source image.

902, generate an R-channel image, a G-channel image and a B-channel image based on the source image.

Illustratively, the electronic device performs RGB channel separation on the source image, and splits the source image into three channels, which are represented as an R-channel image (img_r), a G-channel image (img_g), and a B-channel image (img_b), respectively.

903, perform Gaussian blur on the R-channel image to obtain an R-channel Gaussian blur image, perform Gaussian blur on the G-channel image to obtain a G-channel Gaussian blur image, and perform Gaussian blur on the B-channel image to obtain a B-channel Gaussian blur image.

Illustratively, the electronic device determines a Gaussian kernel corresponding to each Gaussian blur of RGB according to a Gaussian convolution, etc., performs Gaussian blur on the R-channel image (img_r) to obtain the R-channel Gaussian blur image (r_blur), performs Gaussian blur on the G-channel image to obtain the G-channel Gaussian blur image (g_blur), and performs Gaussian blur on the B-channel image to obtain the B-channel Gaussian blur image (b_blur) by using Gaussian kernels.

904, obtain an R-pencil sketch according to the R-channel image and the R-channel Gaussian blur image, obtain a G-pencil sketch according to the G-channel image and the G-channel Gaussian blur image, and obtain a B-pencil sketch according to the B-channel image and the B-channel Gaussian blur image.

Illustratively, the R-pencil sketch may also be represented as r_target, the G-pencil sketch may also be represented as g_target, and the B-pencil sketch may also be represented as b_target. The electronic device adopts a dodge mode to extract an effect, that is, b_target=(img_b/b_blur)×255, g_target=(img_g/g_blur)×255, and r_target=(img_r/r_blur)×255.

905, fuse the R-pencil sketch, the G-pencil sketch and the B-pencil sketch to obtain a color pencil sketch.

Illustratively, the electronic device performs channel fusion on b_target, g_target, and r_target to obtain a final result.

By adopting the solution, the electronic device directly converts a color source image into a color pencil sketch by splitting the RGB channel, and the flexibility is high.

Figure 10:
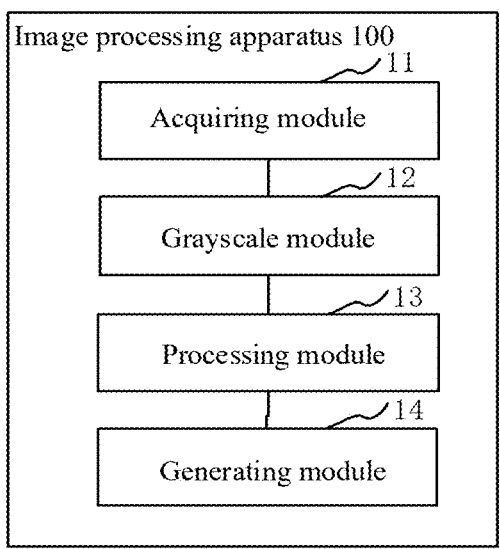
FIG. 10 is a structural block diagram of an image processing apparatus according to an embodiment of the present disclosure.

Corresponding to the image processing method in the foregoing embodiments, FIG. 10 is a structural block diagram of an image processing apparatus according to an embodiment of the present disclosure. For ease of description, only parts related to the embodiments of the present disclosure are shown. Referring to FIG. 10, the image processing apparatus 100 includes: an acquiring module 11, a grayscale module 12, a processing module 13, and a generating module 14.

The acquiring module 11 is configured to acquire a source image;

the grayscale module 12 is configured to generate a grayscale image based on the source image;

the processing module 13 is configured to perform Gaussian blur on the grayscale image to obtain a Gaussian blur image; and the generating module 14 is configured to generate a first sketch image corresponding to the source image based on the Gaussian blur image and the grayscale image.

Figure 11:
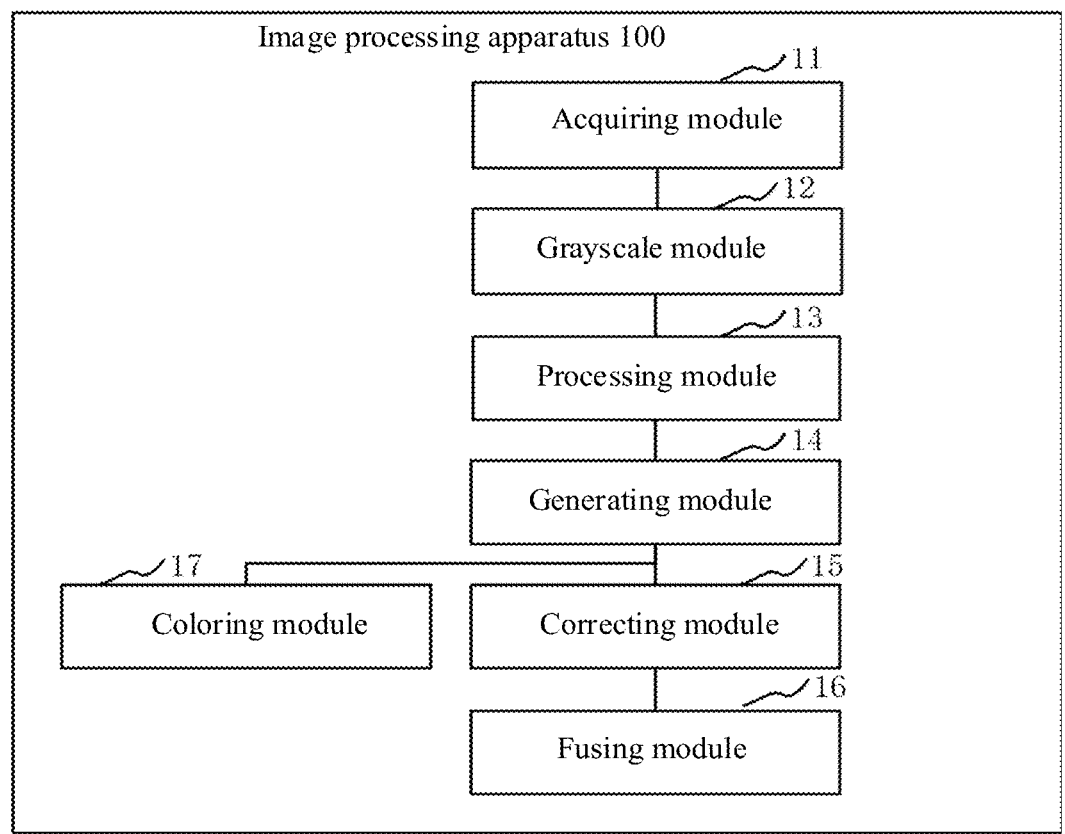
FIG. 11 is a structural block diagram of another image processing apparatus according to an embodiment of the present disclosure.

FIG. 11 is a structural block diagram of another image processing apparatus according to an embodiment of the present disclosure. Based on FIG. 10, the image processing apparatus 100 provided in this embodiment further includes:

a correcting module 15, configured to, after the generating module 14 generates the first sketch image corresponding to the source image based on the Gaussian blur image and the grayscale image, convert the source image into a hue saturation value (HSV) image, determine a highlighted area from the first sketch image according to a saturation of a pixel in the HSV image, and correct the highlighted area to obtain a second sketch image.

In an embodiment of the present disclosure, when determining the highlighted area from the first sketch image according to the saturation of the pixel in the HSV image, the correcting module 15 is configured to: determine, from the HSV image, a pixel whose saturation exceeds a preset threshold after normalization, to obtain a first pixel set, and determine a second pixel set from the first sketch image according to the first pixel set, where pixels in the first pixel set and pixels in the second pixel set are in one-to-one correspondence, and the second pixel set forms the highlighted area; when correcting the highlighted area to obtain the second sketch image, the correcting module 15 is configured to: determine a third pixel set from the grayscale image according to the first pixel set, where pixels in the first pixel set and pixels in the third pixel set are in one-to-one correspondence, and perform weighted fusion on the pixels in the second pixel set and corresponding pixels in the third pixel set, so as to correct the first sketch image to obtain the second sketch image.

In an embodiment of the present disclosure, when performing weighted fusion on the pixels in the second pixel set and the corresponding pixels in the third pixel set, so as to correct the first sketch image to obtain the second sketch image, the correcting module 15 is configured to: determine a first weight according to a saturation of a first pixel in the first pixel set after normalization, where the first weight is positively correlated with the saturation of the first pixel after normalization, determine a second weight according to the first weight, where the second weight is a difference between a preset value and the first weight, determine a fourth pixel after the weighted fusion according to a second pixel in the second pixel set, a third pixel in the third pixel set, the first weight and the second weight, and replace the second pixel in the first sketch image with the fourth pixel to obtain the second sketch image.

Referring to FIG. 11 again, in an embodiment of the present disclosure, the above image processing apparatus 100 further includes:

a fusing module 16, configured to, after the correcting module 15 corrects the highlighted area to obtain the second sketch image, fuse a preset texture image and the second sketch image according to a pixel value of a pixel in the grayscale image.

In an embodiment of the present disclosure, the preset texture image includes a first texture image and a second texture image, directions of texture of the first texture image and texture of the second texture image are mutually perpendicular, and texture color of the first texture image is deeper than texture color of the second texture image.

Referring to FIG. 11 again, in an embodiment of the present disclosure, the above image processing apparatus 100 further includes a coloring module 17, configured to, after the generating module 14 generates the first sketch image based on the Gaussian blur image and the grayscale image, determine a weight of a pixel in the first sketch image according to a pixel value of the pixel in the first sketch image, determine a coloring weight of a corresponding pixel in the first sketch image according to a pixel value of each pixel in the first sketch image, and color the first sketch image to obtain a third sketch image according to the pixel value and the coloring weight of each pixel in the first sketch image and a pixel value of a corresponding pixel in the source image.

In an embodiment of the present disclosure, the generating module 14 is configured to: determine a pixel value of a pixel in the first sketch image according to a pixel value of a pixel in the grayscale image and a pixel value of a pixel in the Gaussian blur image, where sizes of the grayscale image, the Gaussian blur image and the first sketch image are the same, and pixels in the grayscale image, the Gaussian blur image and the first sketch image are in one-to-one correspondence, and generate the first sketch image according to the determined pixel value of the pixel in the first sketch image.

In an embodiment of the present disclosure, the above grayscale module 12 is configured to perform denoising processing on the source image, and convert the source image after denoising processing into the grayscale image.

The apparatus provided in the embodiment may be used to execute technical solutions of the foregoing method embodiments, and implementation principles and technical effects thereof are similar, which are not repeatedly described herein in the embodiment.

Figure 12:
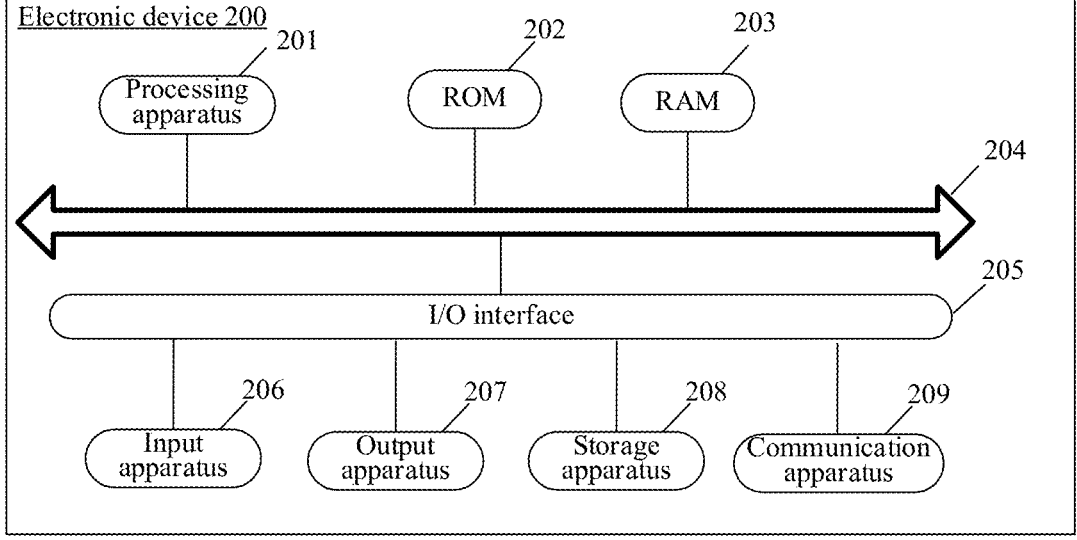
FIG. 12 is a schematic structural diagram of an electronic device for implementing an embodiment of the present disclosure.

FIG. 12 is a schematic structural diagram of an electronic device for implementing the embodiments of the present disclosure, and an electronic device 200 may be a terminal device or a server. The terminal device may include, but is not limited to, a mobile terminal such as a mobile phone, a laptop computer, a digital broadcast receiver, a personal digital assistant (Personal Digital Assistant, PDA), a portable android device (Portable Android Device, PAD), a portable media player (Portable Media Player, PMP), a vehicle-mounted terminal (for example, a vehicle-mounted navigation terminal) and the like, and a fixed terminal such as a digital TV, a desktop computer and the like. The electronic device shown in FIG. 12 is merely an example and should not bring any limitation to the functions and scope of use of the embodiments of the present disclosure.

As shown in FIG. 12, the electronic device 200 may include a processing apparatus (e.g., a central processor, a graphics processor, etc.) 201 that may perform various suitable actions and processing in accordance with a program stored in a read only memory (Read Only Memory, ROM) 202 or a program loaded into a random access memory (Random Access Memory, RAM) 203 from a storage apparatus 208. In the RAM 403, various programs and data necessary for the operation of the electronic device 200 are also stored. The processing apparatus 201, the ROM 202 and the RAM 203 are connected to each other via a bus 204. An input/output (I/O) interface 205 is also connected to the bus 204.

In general, the following apparatuses may be connected to the I/O interface 205: an input apparatus 206 including, for example, a touch screen, a touch pad, a keyboard, a mouse, a camera, a microphone, an accelerometer, a gyroscope and the like; an output apparatus 207 including, for example, a liquid crystal display (Liquid Crystal Display, LCD), a speaker, a vibrator and the like; a storage apparatus 208 including, for example, a magnetic tape, a hard disk, and the like; and a communication apparatus 209. The communication apparatus 209 may allow the electronic device 200 to perform wireless or wired communication with other devices to exchange data. Although FIG. 12 illustrates the electronic device 200 with a variety of apparatuses, it should be understood that, it is not necessary that all of the illustrated apparatuses should be implemented or provided. More or fewer apparatuses may alternatively be implemented or provided.

In particular, the processes described above with reference to the flowcharts can be implemented as computer software programs according to the embodiments of the present disclosure. For example, an embodiment of the present disclosure includes a computer program product including a computer program carried on a computer-readable medium. The computer program includes program codes for executing the method as shown in the flowcharts. In such an embodiment, the computer program may be downloaded and installed from a network via the communication apparatus 209, or installed from the storage apparatus 208, or installed from the ROM 202. When the computer program is executed by the processing apparatus

201, the above described functions defined in the method embodiments of the present disclosure are executed.

An embodiment of the present disclosure includes a computer program including program codes for executing the method shown in the flowcharts.

It should be noted that, the computer-readable medium in the present disclosure may be a computer-readable signal medium or a computer-readable storage medium, or any combination thereof. The computer-readable storage medium may be, for example, but not limited to, an electronic, magnetic, optical, electromagnetic, infrared or semiconductor system, apparatus or device, or any suitable combination of the foregoing. More specific examples of the computer-readable storage medium may include, but are not limited to, an electrical connection based on one or more wires, a portable computer diskette, a hard disk, a random access memory (RAM), a read only memory (ROM), an erasable programmable read only memory (EPROM or Flash memory), an optical fiber, a portable compact disc read only memory (CD-ROM), an optical storage device, a magnetic storage device, or any suitable combination of the foregoing. In the present disclosure, the computer-readable storage medium may be any tangible medium that contains or stores a program for use by or in combination with an instruction execution system, apparatus or device. While in the present disclosure, the computer-readable signal medium may include data signals propagated in a baseband or as part of a carrier wave, in which computer-readable program codes are carried. Such propagated data signals may take a variety of forms, including, but not limited to, an electromagnetic signal, an optical signal, or any suitable combination thereof. The computer-readable signal medium may also be any computer-readable medium that is not a computer-readable storage medium, and can send, propagate or transmit a program for use by or in combination with an instruction execution system, apparatus or device. Program codes contained on the computer-readable medium may be transmitted using any appropriate medium, including, but not limited to, a wireline, an optical fiber cable, RF (radio frequency), etc., or any suitable combination of the foregoing.

The computer-readable medium may be included in the electronic device, or may exist alone and not be installed in the electronic device.

The computer-readable medium carries one or more programs, and when the one or more programs are executed by the electronic device, the electronic device is caused to execute the method in the above described embodiments.

Computer program codes for carrying out operations of the present disclosure may be written in one or more programming languages or any combination thereof, including an object oriented programming language such as Java, Smalltalk, C++ and a conventional procedural programming language such as C programming language or similar programming languages. The program codes may be executed entirely on a user computer, executed partly on the user computer, executed as a stand-alone software package, executed partly on the user computer and partly on a remote computer, or executed entirely on the remote computer or server. In the scenario involving the remote computer, the remote computer may be connected to the user computer through any type of network, including a local area network (Local Area Network, LAN) or a wide area network (Wide Area Network, WAN), or may be connected to an external computer (for example, through the Internet of an Internet service provider).

The flowcharts and block diagrams in the accompanying drawings illustrate architectures, functionalities and operations of possible implementations of systems, methods and computer program products according to various embodiments of the present disclosure. In this regard, each block in the flowcharts or block diagrams may represent a module, a program segment, or a portion of code, which includes one or more executable instructions for implementing specified logical function(s). It should also be noted that, in some alternative implementations, the functions noted in the blocks may be implemented in an order different from those noted in the drawings. For example, two blocks shown in succession may, in fact, be executed substantially concurrently, or the blocks may sometimes be executed in the reverse order, depending upon the involved functionality. It should also be noted that, each block of the block diagrams and/or flowcharts and combinations of blocks in the block diagrams and/or flowcharts can be implemented by special-purpose hardware-based systems that perform specified functions or operations, or combinations of special-purpose hardware and computer instructions.

The units involved in the embodiments of the present disclosure may be implemented through software or hardware. The name of a unit does not constitute a limitation to the unit itself in some cases.

The above functions described herein may be performed, at least in part, by one or more hardware logic components. For example, unrestrictedly, exemplary types of hardware logic components that can be used include: a Field Programmable Gate Array (FPGA), an Application Specific Integrated Circuit (ASIC), an Application Specific Standard Product (ASSP), a System on chip (SOC), a Complex Programmable Logic Device (CPLD), etc.

In the context of the present disclosure, a machine-readable medium may be a tangible medium that may contain or store a program for use by or in combination with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination of the foregoing. More specific examples of the machine-readable storage medium include an electrical connection based on one or more wires, a portable computer diskette, a hard disk, a random access memory (RAM), a read only memory (ROM), an erasable programmable read only memory (EPROM or Flash memory), an optical fiber, a compact disc read only memory (CD-ROM), an optical storage device, a magnetic storage device, or any suitable combination of the foregoing.

In a first aspect, according to one or more embodiments of the present disclosure, provided is a video processing method, including: acquiring a source image; generating a grayscale image based on the source image; performing Gaussian blur on the grayscale image to obtain a Gaussian blur image; and generating a first sketch image corresponding to the source image based on the Gaussian blur image and the grayscale image.

According to one or more embodiments of the present disclosure, after the generating the first sketch image based on the Gaussian blur image and the grayscale image, the method further includes: converting the source image into a hue saturation value (HSV) image; determining a highlighted area from the first sketch image according to a saturation of a pixel in the HSV image; and correcting the highlighted area to obtain a second sketch image.

According to one or more embodiments of the present disclosure, the determining the highlighted area from the first sketch image according to the saturation of the pixel in the HSV image includes: determining, from the HSV image, a pixel whose saturation exceeds a preset threshold after normalization, to obtain a first pixel set; and determining a second pixel set from the first sketch image according to the first pixel set, where pixels in the first pixel set and pixels in the second pixel set are in one-to-one correspondence, and the second pixel set forms the highlighted area; the correcting the highlighted area to obtain the second sketch image includes: determining a third pixel set from the grayscale image according to the first pixel set, where pixels in the first pixel set and pixels in the third pixel set are in one-to-one correspondence; and performing weighted fusion on the pixels in the second pixel set and corresponding pixels in the third pixel set, so as to correct the first sketch image to obtain the second sketch image.

According to one or more embodiments of the present disclosure, the performing weighted fusion on the pixels in the second pixel set and the corresponding pixels in the third pixel set, so as to correct the first sketch image to obtain the second sketch image includes: determining a first weight according to a saturation of a first pixel in the first pixel set after normalization, where the first weight is positively correlated with the saturation of the first pixel after normalization; determining a second weight according to the first weight, where the second weight is a difference between a preset value and the first weight; determining a fourth pixel after the weighted fusion according to a second pixel in the second pixel set, a third pixel in the third pixel set, the first weight and the second weight; and replacing the second pixel in the first sketch image with the fourth pixel to obtain the second sketch image.

According to one or more embodiments of the present disclosure, after the correcting the highlighted area to obtain the second sketch image, the method further includes: fusing a preset texture image and the second sketch image according to a pixel value of a pixel in the grayscale image.

According to one or more embodiments of the present disclosure, the preset texture image includes a first texture image and a second texture image, directions of texture of the first texture image and texture of the second texture image are mutually orthogonal, and texture color of the first texture image is deeper than texture color of the second texture image.

According to one or more embodiments of the present disclosure, after the generating the first sketch image based on the Gaussian blur image and the grayscale image, the method further includes: determining a weight of a pixel in the first sketch image according to a pixel value of the pixel in the first sketch image; determining a coloring weight of a corresponding pixel in the first sketch image according to a pixel value of each pixel in the first sketch image; and coloring the first sketch image to obtain a third sketch image according to the pixel value and the coloring weight of each pixel in the first sketch image and a pixel value of a corresponding pixel in the source image.

According to one or more embodiments of the present disclosure, the generating the first sketch image based on the Gaussian blur image and the grayscale image includes: determining a pixel value of a pixel in the first sketch image according to a pixel value of a pixel in the grayscale image and a pixel value of a pixel in the Gaussian blur image, where sizes of the grayscale image, the Gaussian blur image and the first sketch image are the same, and pixels in the grayscale image, the Gaussian blur image and the first sketch image are in one-to-one correspondence; and generating the first sketch image according to the determined pixel value of the pixel in the first sketch image.

According to one or more embodiments of the present disclosure, the converting the source image into the grayscale image includes: performing denoising processing on the source image; and converting the source image after denoising processing into the grayscale image.

In a second aspect, according to one or more embodiments of the present disclosure, provided is an image processing apparatus, including:

an acquiring module, configured to acquire a source image;

a grayscale module, configured to generate a grayscale image based on the source image;

a processing module, configured to perform Gaussian blur on the grayscale image to obtain a Gaussian blur image; and a generating module, configured to generate a first sketch image corresponding to the source image based on the Gaussian blur image and the grayscale image.

According to one or more embodiments of the present disclosure, the above apparatus further includes: a correcting module, configured to, after the generating module generates the first sketch image corresponding to the source image based on the Gaussian blur image and the grayscale image, convert the source image into a hue saturation value (HSV) image, determine a highlighted area from the first sketch image according to a saturation of a pixel in the HSV image, and correct the highlighted area to obtain a second sketch image.

According to one or more embodiments of the present disclosure, when determining the highlighted area from the first sketch image according to the saturation of the pixel in the HSV image, the correcting module is configured to: determine, from the HSV image, a pixel whose saturation exceeds a preset threshold after normalization, to obtain a first pixel set, and determine a second pixel set from the first sketch image according to the first pixel set, where pixels in the first pixel set and pixels in the second pixel set are in one-to-one correspondence, and the second pixel set forms the highlighted area;

when correcting the highlighted area to obtain the second sketch image, the correcting module is configured to: determine a third pixel set from the grayscale image according to the first pixel set, where pixels in the first pixel set and pixels in the third pixel set are in one-to-one correspondence, and perform weighted fusion on the pixels in the second pixel set and corresponding pixels in the third pixel set, so as to correct the first sketch image to obtain the second sketch image.

According to one or more embodiments of the present disclosure, when performing weighted fusion on the pixels in the second pixel set and the corresponding pixels in the third pixel set, so as to correct the first sketch image to obtain the second sketch image, the correcting module is configured to: determine a first weight according to a saturation of a first pixel in the first pixel set after normalization, where the first weight is positively correlated with the saturation of the first pixel after normalization, determine a second weight according to the first weight, where the second weight is a difference between a preset value and the first weight, determine a fourth pixel after the weighted fusion according to a second pixel in the second pixel set, a third pixel in the third pixel set, the first weight and the second weight, and replace the second pixel in the first sketch image with the fourth pixel to obtain the second sketch image.

According to one or more embodiments of the present disclosure, the above apparatus further includes: a fusing module, configured to, after the correcting module corrects the highlighted area to obtain the second sketch image, fuse a preset texture image and the second sketch image according to a pixel value of a pixel in the grayscale image.

According to one or more embodiments of the present disclosure, the preset texture image includes a first texture image and a second texture image, directions of texture of the first texture image and texture of the second texture image are mutually perpendicular, and texture color of the first texture image is deeper than texture color of the second texture image.

According to one or more embodiments of the present disclosure, the above apparatus further includes: a coloring module, configured to, after the generating module generates the first sketch image based on the Gaussian blur image and the grayscale image, determine a weight of a pixel in the first sketch image according to a pixel value of the pixel in the first sketch image, determine a coloring weight of a corresponding pixel in the first sketch image according to a pixel value of each pixel in the first sketch image, and color the first sketch image to obtain a third sketch image according to the pixel value and the coloring weight of each pixel in the first sketch image and a pixel value of a corresponding pixel in the source image.

According to one or more embodiments of the present disclosure, the generating module is configured to: determine a pixel value of a pixel in the first sketch image according to a pixel value of a pixel in the grayscale image and a pixel value of a pixel in the Gaussian blur image, where sizes of the grayscale image, the Gaussian blur image and the first sketch image are the same, and pixels in the grayscale image, the Gaussian blur image and the first sketch image are in one-to-one correspondence, and generate the first sketch image according to the determined pixel value of the pixel in the first sketch image.

According to one or more embodiments of the present disclosure, the grayscale module is configured to perform denoising processing on the source image, and convert the source image after denoising processing into the grayscale image.

In a third aspect, according to one or more embodiments of the present disclosure, provided is an electronic device, including: at least one processor and a memory;

where the memory stores computer execution instructions; and the at least one processor executes the computer execution instructions stored in the memory, causing the at least one processor to execute the above image processing method.

In a fourth aspect, according to one or more embodiments of the present disclosure, provided is a computer-readable storage medium. The computer-readable storage medium stores computer execution instructions. When a processor executes the computer execution instructions, the above image processing method is implemented.

In a fifth aspect, according to one or more embodiments of the present disclosure, provided is a computer program product including a computer program stored in a readable storage medium, at least one processor of an electronic device reads the computer program from the readable storage medium, and the at least one processor executes the computer program, causing the electronic device to implement the above image processing method.

In a sixth aspect, according to one or more embodiments of the present disclosure, provided is a computer program. The computer program is stored in a readable storage medium. At least one processor of an electronic device can read the computer program from the readable storage medium, and the at least one processor executes the computer program, causing the electronic device to implement the above image processing method.

The foregoing description is merely illustrative of the preferred embodiments of the present disclosure and of the technical principles applied thereto. It should be appreciated by a person skilled in the art that, the disclosure scope of the present disclosure is not limited to the technical solutions formed by specific combinations of the described technical features, and meanwhile should also cover other technical solutions formed by any combination of the described technical features or equivalent features thereof without departing from the described disclosed concept, for example, technical solutions formed by substituting the above features and technical features having similar functions as disclosed in the present disclosure (but not limited thereto) for one another.

In addition, while operations are depicted in a particular order, it should not be understood as that the operations need to be performed in a particular order as shown or in a sequential order. Multitasking and parallel processing may be advantageous in certain circumstances. Likewise, while several specific implementation details are included in the above discussion, these should not be construed as limiting the scope of the present disclosure. Certain features that are described in the context of separate embodiments can also be implemented in combination in a single embodiment. Conversely, various features that are described in the context of a single embodiment can also be implemented separately or in any suitable sub-combination in a plurality of embodiments.

Although the subject matter has been described in language specific to structural features and/or method logical acts, it should be understood that, the subject matter defined in the appended claims is not necessarily limited to the specific features or acts described above. Rather, the specific features and acts described above are merely illustrative forms for implementing the claims.

What is claimed is:

1. An image processing method, comprising:

acquiring a source image;

converting the source image into a grayscale image;

performing Gaussian blur on the grayscale image to obtain a Gaussian blur image; and generating a first sketch image corresponding to the source image based on the Gaussian blur image and the grayscale image, wherein after the generating the first sketch image based on the Gaussian blur image and the grayscale image, the method further comprises:

converting the source image into a hue saturation value (HSV) image;

determining a highlighted area from the first sketch image according to a saturation of a pixel in the HSV image; and correcting the highlighted area to obtain a second sketch image, the determining the highlighted area from the first sketch image according to the saturation of the pixel in the HSV image comprises:

determining, from the HSV image, a pixel whose saturation exceeds a preset threshold after normalization, to obtain a first pixel set; and determining a second pixel set from the first sketch image according to the first pixel set, wherein pixels in the first pixel set and pixels in the second pixel set are in one-to-one correspondence, and the second pixel set forms the highlighted area, and the correcting the highlighted area to obtain the second sketch image comprises:

determining a third pixel set from the grayscale image according to the first pixel set, wherein the pixels in the first pixel set and pixels in the third pixel set are in one-to-one correspondence; and performing weighted fusion on the pixels in the second pixel set and corresponding pixels in the third pixel set, so as to correct the first sketch image to obtain the second sketch image.

2. The method according to claim 1, wherein the performing weighted fusion on the pixels in the second pixel set and the corresponding pixels in the third pixel set, so as to correct the first sketch image to obtain the second sketch image comprises:

determining a first weight according to a saturation of a first pixel in the first pixel set after normalization, wherein the first weight is positively correlated with the saturation of the first pixel after normalization;

determining a second weight according to the first weight, wherein the second weight is a difference between a preset value and the first weight;

determining a fourth pixel after the weighted fusion according to a second pixel in the second pixel set, a third pixel in the third pixel set, the first weight and the second weight; and replacing the second pixel in the first sketch image with the fourth pixel to obtain the second sketch image.

3. The method according to claim 1, wherein after the correcting the highlighted area to obtain the second sketch image, the method further comprises:

fusing a preset texture image and the second sketch image according to a pixel value of a pixel in the grayscale image.

4. The method according to claim 3, wherein the preset texture image comprises a first texture image and a second texture image, directions of texture of the first texture image and texture of the second texture image are mutually orthogonal, and texture color of the first texture image is deeper than texture color of the second texture image.

5. The method according to claim 1, wherein after the generating the first sketch image based on the Gaussian blur image and the grayscale image, the method further comprises:

determining a weight of a pixel in the first sketch image according to a pixel value of the pixel in the first sketch image;

determining a coloring weight of a corresponding pixel in the first sketch image according to a pixel value of each pixel in the first sketch image; and coloring the first sketch image to obtain a third sketch image according to the pixel value and the coloring weight of each pixel in the first sketch image and a pixel value of a corresponding pixel in the source image.

6. The method according to claim 1, wherein the generating the first sketch image based on the Gaussian blur image and the grayscale image comprises:

determining a pixel value of a pixel in the first sketch image according to a pixel value of a pixel in the grayscale image and a pixel value of a pixel in the Gaussian blur image, wherein sizes of the grayscale image, the Gaussian blur image and the first sketch image are the same, and pixels in the grayscale image, the Gaussian blur image and the first sketch image are in one-to-one correspondence; and generating the first sketch image according to the determined pixel value of the pixel in the first sketch image.

7. The method according to claim 1, wherein the converting the source image into the grayscale image comprises:

performing denoising processing on the source image; and converting the source image after denoising processing into the grayscale image.

8. An electronic device, comprising: at least one processor and a memory;

wherein the memory stores computer execution instructions; and the at least one processor executes the computer execution instructions stored in the memory, causing the at least one processor to execute the following operations:

acquiring a source image;

converting the source image into a grayscale image;

performing Gaussian blur on the grayscale image to obtain a Gaussian blur image; and generating a first sketch image corresponding to the source image based on the Gaussian blur image and the grayscale image, wherein after the generating the first sketch image based on the Gaussian blur image and the grayscale image, the at least one processor is further caused to execute the operations of:

converting the source image into a hue saturation value (HSV) image;

determining a highlighted area from the first sketch image according to a saturation of a pixel in the HSV image; and correcting the highlighted area to obtain a second sketch image, the determining the highlighted area from the first sketch image according to the saturation of the pixel in the HSV image comprises:

determining, from the HSV image, a pixel whose saturation exceeds a preset threshold after normalization, to obtain a first pixel set; and determining a second pixel set from the first sketch image according to the first pixel set, wherein pixels in the first pixel set and pixels in the second pixel set are in one-to-one correspondence, and the second pixel set forms the highlighted area, and the correcting the highlighted area to obtain the second sketch image comprises:

determining a third pixel set from the grayscale image according to the first pixel set, wherein the pixels in the first pixel set and pixels in the third pixel set are in one-to-one correspondence; and performing weighted fusion on the pixels in the second pixel set and corresponding pixels in the third pixel set, so as to correct the first sketch image to obtain the second sketch image.

9. The electronic device according to claim 8, wherein the performing weighted fusion on the pixels in the second pixel set and the corresponding pixels in the third pixel set, so as to correct the first sketch image to obtain the second sketch image comprises:

determining a first weight according to a saturation of a first pixel in the first pixel set after normalization, wherein the first weight is positively correlated with the saturation of the first pixel after normalization;

determining a second weight according to the first weight, wherein the second weight is a difference between a preset value and the first weight;

determining a fourth pixel after the weighted fusion according to a second pixel in the second pixel set, a third pixel in the third pixel set, the first weight and the second weight; and replacing the second pixel in the first sketch image with the fourth pixel to obtain the second sketch image.

10. The electronic device according to claim 8, wherein where after the correcting the highlighted area to obtain the second sketch image, the at least one processor is further caused to execute the operation of:

fusing a preset texture image and the second sketch image according to a pixel value of a pixel in the grayscale image.

11. The electronic device according to claim 10, wherein the preset texture image comprises a first texture image and a second texture image, directions of texture of the first texture image and texture of the second texture image are mutually orthogonal, and texture color of the first texture image is deeper than texture color of the second texture image.

12. The electronic device according to claim 8, wherein after the generating the first sketch image based on the Gaussian blur image and the grayscale image, the at least one processor is further caused to execute the operations of:

determining a weight of a pixel in the first sketch image according to a pixel value of the pixel in the first sketch image;

determining a coloring weight of a corresponding pixel in the first sketch image according to a pixel value of each pixel in the first sketch image; and coloring the first sketch image to obtain a third sketch image according to the pixel value and the coloring weight of each pixel in the first sketch image and a pixel value of a corresponding pixel in the source image.

13. The electronic device according to claim 8, wherein the generating the first sketch image based on the Gaussian blur image and the grayscale image comprises:

determining a pixel value of a pixel in the first sketch image according to a pixel value of a pixel in the grayscale image and a pixel value of a pixel in the Gaussian blur image, wherein sizes of the grayscale image, the Gaussian blur image and the first sketch image are the same, and pixels in the grayscale image, the Gaussian blur image and the first sketch image are in one-to-one correspondence; and generating the first sketch image according to the determined pixel value of the pixel in the first sketch image.

14. The electronic device according to claim 8, wherein the converting the source image into the grayscale image comprises:

performing denoising processing on the source image; and converting the source image after denoising processing into the grayscale image.

15. A non-transitory computer-readable storage medium, wherein the computer readable storage medium stores computer execution instructions, and when a processor executes the computer execution instructions, the following operations are executed:

acquiring a source image;

converting the source image into a grayscale image;

performing Gaussian blur on the grayscale image to obtain a Gaussian blur image; and generating a first sketch image corresponding to the source image based on the Gaussian blur image and the grayscale image, wherein after the generating the first sketch image based on the Gaussian blur image and the grayscale image, the following operations are further executed:

converting the source image into a hue saturation value (HSV) image;

determining a highlighted area from the first sketch image according to a saturation of a pixel in the HSV image; and correcting the highlighted area to obtain a second sketch image, the determining the highlighted area from the first sketch image according to the saturation of the pixel in the HSV image comprises:

determining, from the HSV image, a pixel whose saturation exceeds a preset threshold after normalization, to obtain a first pixel set; and determining a second pixel set from the first sketch image according to the first pixel set, wherein pixels in the first pixel set and pixels in the second pixel set are in one-to-one correspondence, and the second pixel set forms the highlighted area, and the correcting the highlighted area to obtain the second sketch image comprises:

determining a third pixel set from the grayscale image according to the first pixel set, wherein the pixels in the first pixel set and pixels in the third pixel set are in one-to-one correspondence; and performing weighted fusion on the pixels in the second pixel set and corresponding pixels in the third pixel set, so as to correct the first sketch image to obtain the second sketch image.

* * * * *